United States Patent [19]

Beaudoin

[11] Patent Number: 5,040,389
[45] Date of Patent: Aug. 20, 1991

[54] TANDEM WHEEL ATTACHMENT

[76] Inventor: Fernand Beaudoin, 915 Notre-Dame St., Repentigny, Quebec, Canada

[21] Appl. No.: 637,559

[22] Filed: Jan. 2, 1991

[51] Int. Cl.⁵ .................. B60R 25/00; E05B 73/00
[52] U.S. Cl. .............................. 70/226; 70/14; 70/18
[58] Field of Search .............. 70/225, 226, 14, 18, 70/237

[56] References Cited

U.S. PATENT DOCUMENTS

| | | | |
|---|---|---|---|
| 4,399,893 | 8/1983 | Switzer | 70/226 |
| 4,582,176 | 4/1986 | Roberts | 70/226 |
| 4,723,426 | 2/1988 | Beaudoin | 70/14 |
| 4,854,144 | 8/1989 | Davis | 70/226 |

Primary Examiner—Robert L. Wolfe
Attorney, Agent, or Firm—Longacre & White

[57] ABSTRACT

A tandem wheel attachment for hindering movement of a vehicle having tandem wheels; it comprises a T-shaped member adapted to be secured between the tandem wheels, and a wheel bracing member which securely engages one extremity of the T-shaped member and covers a major portion of the outer face of the outer wheel hub. Mounted to the T-shaped member is a piercing element in contact with the tires but which will pierce the tires only if the wheels are rotated with the attachment thereon.

11 Claims, 3 Drawing Sheets

TANDEM WHEEL ATTACHMENT

FIELD OF THE INVENTION

The present invention pertains to a wheel attachment for hindering movement of a vehicle, such as a truck or a trailer, having tandem wheels.

BACKGROUND OF THE INVENTION

It is common for operators of parking lots, officers of law to impound vehicles for various reasons, such as non-payment of parking dues, law infractions, or car owners to prevent theft of their vehicle.

Many devices have been used for such purposes; for example, one clamp designed to be placed on wheels of vehicles may be found described in the inventor's earlier U.S. Pat. No. 4,723,426 issued Feb. 9, 1988. However, such device is not suitable for mounting to trucks or trailers having tandem wheels disposed adjacent one another on an axle.

Tandem tire devices are known; for example, U.S. Pat. No. 4,694,936, issued Sept. 22, 1987 to Jackson and U.S. Pat. No. 4,934,489 issued June 19, 1990 also to Jackson describe brake systems for tandem wheels; however, they are concerned with tires which are radially closely spaced to each other on a vehicle.

U.S. Pat. No. 4,399,893 issued Aug. 23, 1983 to Switzer describes a locking wheel block having a pair of wheel ramps and a locking member adapted to releasably connect the wheel block to the wheel so as to prevent unwanted movement of the vehicle. It is evident that, with such block, if someone wishes to overcome the locking feature, he needs only to unbolt the outer wheel from its drum and remove the wheel thus easily obtaining access to the locking member located between the tandem wheels.

OBJECTS AND STATEMENT OF THE INVENTION

It is an object of the present invention to provide on vehicles, such as multi-wheeled vehicles, a tandem wheel attachment which will hinder unwanted movement of the vehicle. This is achieved by providing a locking member between the tandem wheels which cannot be reached by the removal of the outer wheel and which includes a piercing element that will cause, if the wheels are rotated, damage to the tires.

The present invention therefore relates to a tandem wheel attachment for hindering movement of a vehicle having tandem wheels, each wheel consisting of a tire on a hub, the hub including an inside rim and an outer face, comprising:

a T-shaped member having a head and a stem; opposite ends of the head, when mounted between the tandem wheels, contacting the inside rim of each wheel;

wheel bracing means including hub covering means and an elongated transverse member adapted, when mounted to said wheels, to contact tread surfaces of the wheels, the transverse member engaging the stem of the T-shaped member;

means for locking the stem to the transverse member; and piercing means mounted on the stem and adapted to contact each tire of the tandem wheels and to pierce the tires when the tires are enlarged as a result of ground contact should the wheels with the attachment thereon are rotated.

In one form of the invention, the hub covering means is in the shape of a dish which covers a major portion of the exterior face of the hub.

In a further embodiment of the invention, the dish is longitudinally adjustable to the transverse member to suit various diameters of tires.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
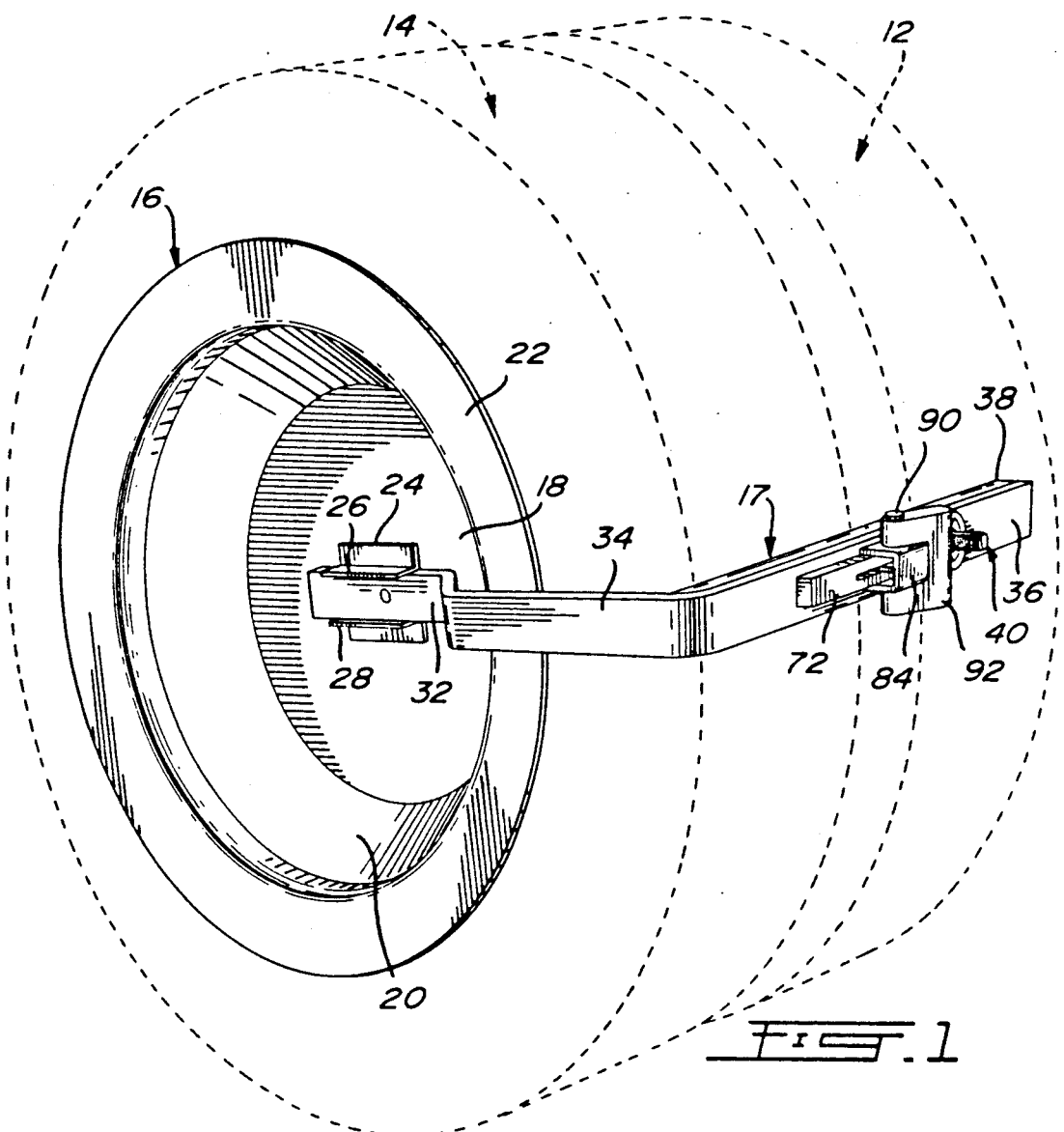
FIG. 1 is a perspective view of an attachment, made in accordance with the present invention, being mounted on tandem wheels (shown in dotted lines)

Referring to FIG. 1, there is shown an attachment made in accordance with the present invention, being mounted to tandem wheels 12 and 14.

Figure 3:
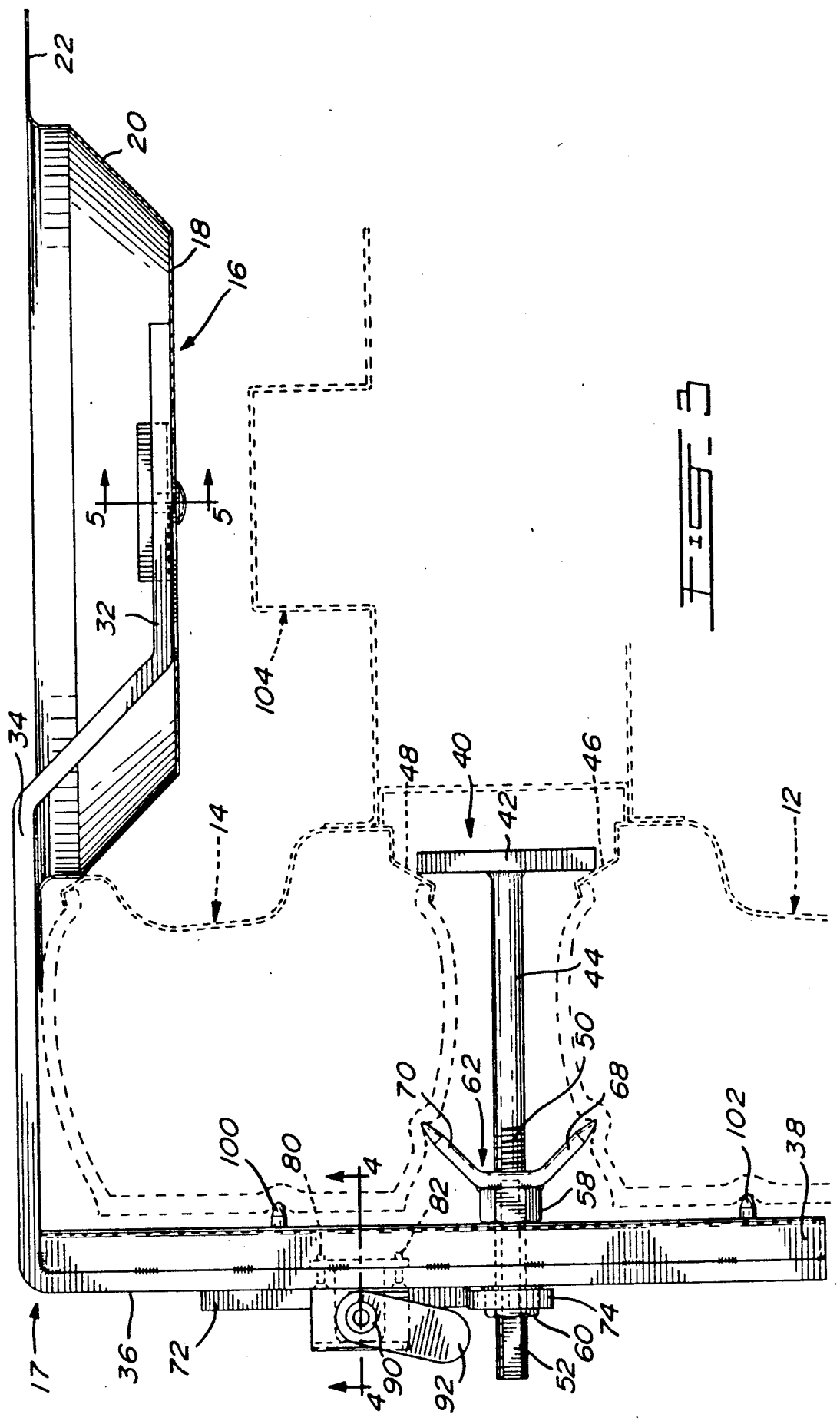
FIG. 3 is a top view, with parts in cross-section, of the wheel attachment.
Figure 4:
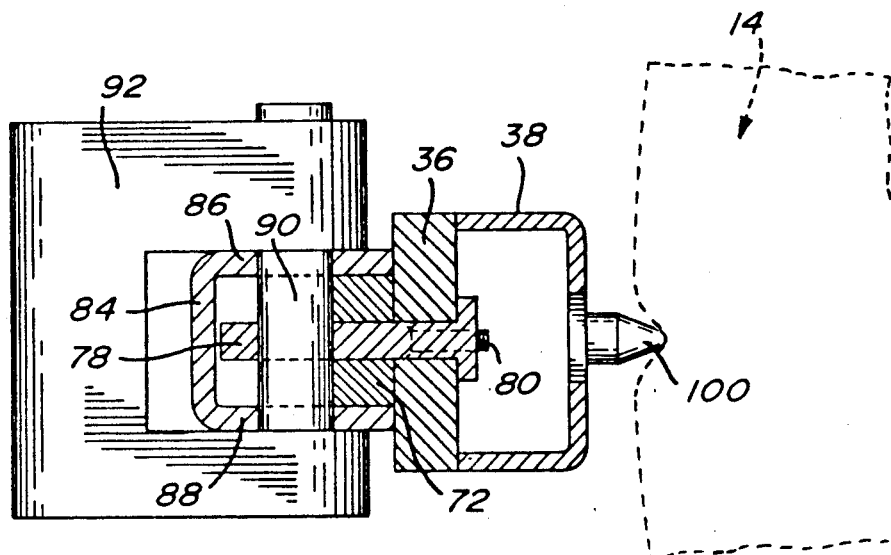
FIG. 4 is a cross-sectional view taken along lines 4—4 of FIG. 3.

The attachment first comprises a wheel bracing device that includes a hub covering element 16 and an elongated bar-like member 17. The hub covering element 16 has the shape of a dish with an inner circular wall 18, frusto-conical side wall 20 and a flat annular outer edge 22. The size and dimensions of this dish-like member are determined so as to cover a major portion of the hub area of the outer wheel 14. The inner wall 18 has, fixedly connected thereto, a plate 24 with a pair of lugs 26 and 28 between which is received one end 32 of the elongated bar-like member 17. The latter includes a first portion 34 extending parallel to the wheels and a second portion 36 extending perpendicularly to portion 34 and parallel to the axis of the wheels. End 32 of the member is parallel to portion 34 but lies within the dish member 16. Referring to FIGS. 3 and 4, to the rear wall of bar portion 36 is fixedly mounted, preferably by welding, a U-shaped member 38 in the manner shown. A pair of pins 100, 102 are provided on the inner wall of member 38 to engage the treads of the tires.

Figure 2:
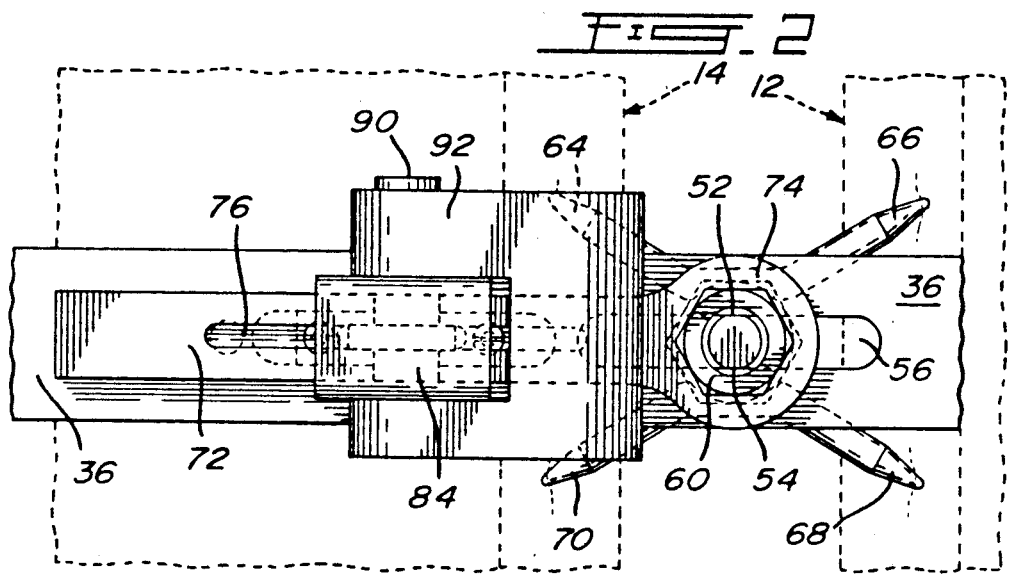
FIG. 2 is a side elevation of part of the attachment as seen from the right of FIG. 1.

The attachment further comprises, a T-shaped member 40 having a head 42 and a stem 44 that extends longitudinally between the two wheels 12 and 14. The opposite ends of the head 42 contact the inside rims 46 and 48 of wheels 12 and 14, respectively. The stem 44 has a threaded end 50 which extends through and protrude members 38 and 36. A portion 50 of the cylindrically shaped stem is threaded and displays a pair of opposite plane surfaces 52 and 54 (see also FIG. 2) thus allowing the stem 44 to protrude an elongated slot 56, having parallel upper and lower edges in bar portion 36. A nut 58 is freely (i.e. non-threadedly) mounted on stem 50 on the inner side of member 38; "freely mounted" means that the diameter of the threads on stem 50 (for example, ⅜ of an inch) is slightly smaller than the diameter of the threads in nut 58 (for example, ⅞ of an inch) so that the nut may move longitudinally on stem 50 without rotation although contact may occur between the stem threads and the nut threads during such displacement. A second nut 60 is disposed on the outer side of member 36 and is threadedly engaged with the stem portion 50 to secure the T-shaped member to the transverse member 36. Also slidably mounted to the stem portion 50 is a piercing element 62 which is welded to the nut 58 and consists of two pairs of upwardly extending pins 64, 66, 68 and 70, each having pointed extremities. The distance between pins 66 and 68 is different than the distance between pins 68 and 70, thus allowing for variations in the distance separating tires. As illustrated, these pins are slightly forced against the side walls of the tires when the attachment is mounted to the tandem wheels.

To secure the T-shaped member 40 to the wheel bracing member portion 36, a wrench 72 is used having a head 74 adapted to engage the nut 60. The wrench has a slotted opening 76 allowing the passage therethrough of a lug 78 having a circular hole (not shown) therethrough. This lug is secured to member portion 36 by means of screws 80 and 82. A U-shaped member 84 has its opposite walls 86 and 88 contacting the outer wall of member 36 and including therewithin the wrench 72. The opposite walls 86 and 88 each include a circular hole which is in registry with the circular hole of lug plate 78 to receive the cylindrical pin 90 of a padlock 92.

Figure 5:
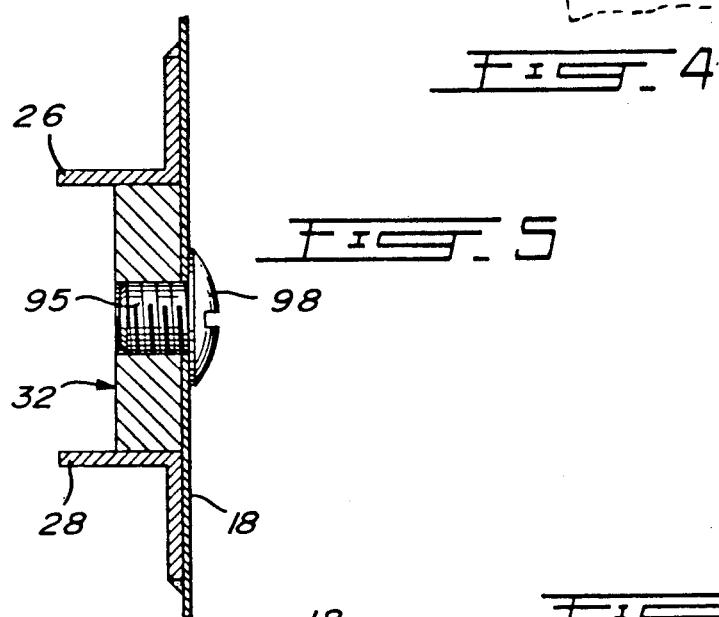
FIG. 5 is a cross-sectional view taken along lines 5—5 of FIG. 3.
Figure 6:
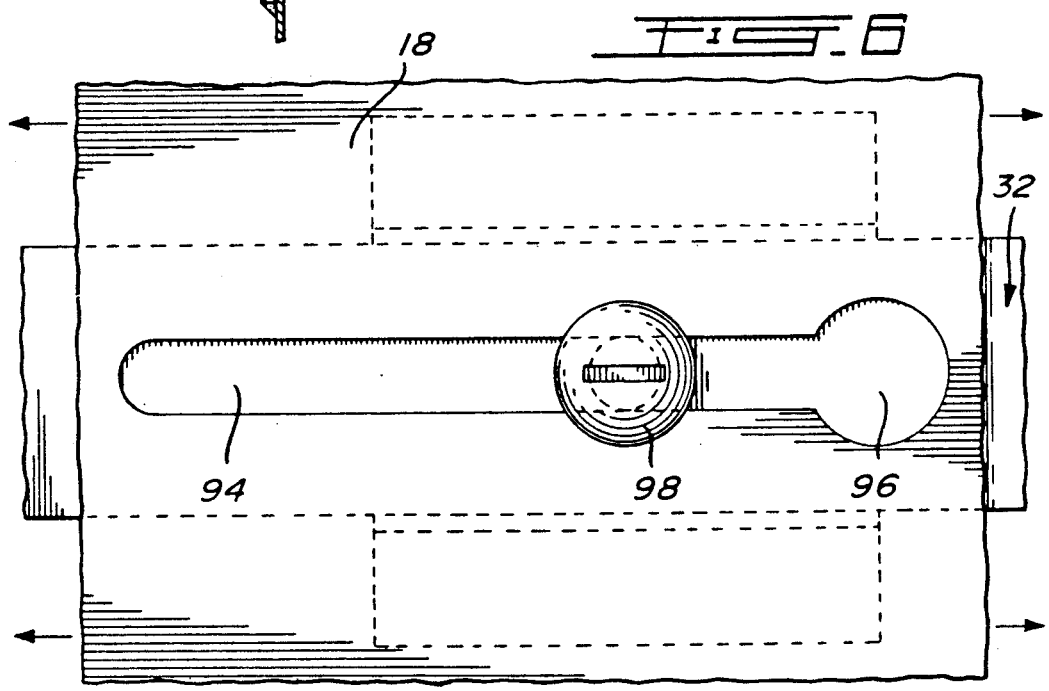
FIG. 6 is a front enlarged view of the adjusting feature of the dish-like member.

Referring to FIGS. 5 and 6, adjustment of the dish-like member 16 relative to the bracing member 17 is accomplished by the cooperation of an elongated slot 94 in wall 18 and of a bolt 95; the slot has an enlarged extremity 96 to allow passage of the bolt head 98.

The mounting of the attachment to the tandem wheels is accomplished by first inserting the T-shaped member 40 between the two tires of the wheels and then rotating the T-shaped member 90° to adopt the position shown in FIG. 3 wherein the opposite ends of the head abut the inside rims 46 and 48 of the wheels. The piercing element 62, with its welded nut 58, is slidably moved on the threaded portion 50 of the stem of the T-shaped member to contact the tire walls. Then, bracing member 17 with the dish member 16 is placed against the tandem wheels (in the manner shown in FIG. 1) with the dish member overlying the hub 104 of the outermost wheel. Section 36 is positioned so that the stem portion 50 is slid through slot 56. Nut 60 is then placed on the stem 50 and, with the use of the wrench 72, section 36 is advanced to come in contact with the tread surfaces of the tires, pins 100, 102 engaged in the treads of the tires. Simultaneously, the piercing element 62 is forced further against the tire walls. Then, wrench 72 is placed in the position shown in FIG. 3 with its head 74 engaged with nut 60 and its remaining portion abutting the side wall of section 36 with the lug 78 protruding slot 76. The U-shaped member 64 is then placed over the lug and the wrench 72; the circular holes in walls 86 and 88 are located in registry with that of lug 78. Padlock 92 is positioned over member 84 and pin 90 is inserted to extend through the previously mentioned holes thus locking the entire attachment to the tandem wheels.

Although the invention has been described above in relation to one specific form, it is evident that it may be modified and refined in various ways. For example, bracing member 17 could be made of two separate sections 34 and 36 which would be adjustably interengageable thereby also allowing a transversal adjustment of the bracing device. It is therefore wished to have it understood that the present invention should not be limited in interpretation except by the terms of the following claims.

The embodiments of the invention in which an exclusive property or privilege is claimed are defined as follows:

1. A tandem wheel attachment for hindering movement of a vehicle having tandem wheels, each wheel consisting of a tire on a hub, said hub including an inside rim and an outer face, comprising:
   a T-shaped member having a head and a stem; opposite ends of said head, when mounted between the tandem wheels, contacting the inside rim of each wheel;
   wheel bracing means including hub covering means and an elongated transverse member adapted, when mounted to said wheels, to contact tread surfaces of said wheels, said transverse member engaging the stem of said T-shaped member;
   means for lockingly secure said stem to said transverse member; and
   piercing means mounted on said stem and adapted to contact each tire of said tandem wheels and to pierce said tires when said tires are enlarged as a result of ground contact should the wheels with the attachment thereon be rotated.

2. A tandem wheel attachment as defined in claim 1, wherein said hub covering means is mounted at one end of said transverse member and is shaped to overlie a major portion of the outer face of the hub of an outer wheel of said tandem wheels.

3. A tandem wheel attachment as defined in claim 2, wherein said hub covering means consists of a dish-like element; means on said dish-like element allowing adjustment of said element relative to said transverse member.

4. A tandem wheel attachment as defined in claim 1, wherein said transverse member has a first portion extending substantially parallel to said wheels and a second portion extending perpendicularly to said first portion and parallel to the axis of said wheels.

5. A tandem wheel attachment as defined in claim 4, wherein said stem has a threaded portion extending through a slot in said second portion of said transverse member thereby defining an end protruding on an outer side of said second portion of said transverse member opposite to the side contacting the tread surfaces of the tires.

6. A tandem wheel attachment as defined in claim 5, wherein said threaded portion of said stem extending through said transverse member is generally cylindrical with diametrically opposite plane surfaces; said slot allowing passage of said plane surfaces therethrough but preventing rotation of said stem portion therein.

7. A tandem wheel attachment as defined in claim 5, wherein said secure means consist of (a) a nut threadedly mounted on said threaded portion of said stem, (b) a wrench having a head adapted to engage said nut, and (c) means for securing said wrench to said outer side of said transverse member.

8. A tandem wheel attachment as defined in claim 7, wherein said second portion of said transverse member includes a second slot and wherein said wrench has a slot in a handle portion thereof; said secure means including lug means mounted to said transverse member and having a portion protruding said second slot and said slot of said wrench, and a padlock lockingly engaging said protruding portion.

9. A tandem wheel attachment as defined in claim 4, wherein second portion of said transverse member displays, on an inner side thereof, tread engaging pins contacting said tread surfaces.

10. A tandem wheel attachment as defined in claim 1, wherein said piercing means consist of opposite pairs of outwardly projecting pins having pointed extremities.

11. A tandem wheel attachment as defined in claim 10, wherein said piercing means is slidably and longitudinally displaceable along said stem.

* * * * *